(12) United States Patent
Dubois et al.

(10) Patent No.: US 12,191,688 B2
(45) Date of Patent: Jan. 7, 2025

(54) SYSTEMS AND METHODS FOR INCREASING DEGRADED TORQUE AVAILABILITY

(71) Applicant: NXP B.V., Eindhoven (NL)

(72) Inventors: Antoine Fabien Dubois, Austin, TX (US); Erik Santiago, La Tour du Crieu (FR)

(73) Assignee: NXP B.V., Eindhoven (NL)

( * ) Notice: Subject to any disclaimer, the term of this patent is extended or adjusted under 35 U.S.C. 154(b) by 481 days.

(21) Appl. No.: 17/658,339

(22) Filed: Apr. 7, 2022

(65) Prior Publication Data

US 2022/0329085 A1 Oct. 13, 2022

(30) Foreign Application Priority Data

Apr. 8, 2021 (EP) .................................... 21305449

(51) Int. Cl.
*H02J 7/00* (2006.01)
*B60L 3/00* (2019.01)

(52) U.S. Cl.
CPC .......... *H02J 7/0031* (2013.01); *B60L 3/0046* (2013.01); *H02J 7/007* (2013.01); *B60L 3/0092* (2013.01); *B60L 2260/26* (2013.01); *B60L 2270/20* (2013.01)

(58) Field of Classification Search
CPC ....... H02J 7/0031; H02J 7/007; B60L 3/0046; B60L 3/0092; B60L 2270/20; B60L 2260/26
USPC ......................................... 320/104, 134, 140
See application file for complete search history.

(56) References Cited

U.S. PATENT DOCUMENTS

| | | | |
|---|---|---|---|
| 7,688,023 B2 | 3/2010 | Yoon et al. | |
| 9,676,278 B2 | 6/2017 | Mueller | |
| 2006/0220601 A1* | 10/2006 | Horii | B60L 1/14 318/109 |
| 2015/0231976 A1 | 8/2015 | Byun et al. | |
| 2015/0255975 A1* | 9/2015 | Siciak | H02J 7/0031 307/9.1 |
| 2020/0039365 A1* | 2/2020 | Chang | B60L 3/04 |
| 2020/0235586 A1* | 7/2020 | Yang | H02J 7/007 |

FOREIGN PATENT DOCUMENTS

EP          1204186 A2   5/2002

* cited by examiner

*Primary Examiner* — Edward Tso
*Assistant Examiner* — Aaron Piggush

(57) ABSTRACT

In a battery management system, during a pre-charge mode, a first contactor is closed to provide a pre-charge current path from a low voltage battery supply node through a DCDC converter and through the first contactor to pre-charge a capacitor of an inverter for an electric motor. During a drive mode following the pre-charge mode, the first contactor is opened and a second contactor is closed to provide a drive mode current path from a high voltage battery supply node through the second contactor to the inverter to power the electric motor. In response to detecting an open fault in the second contactor during the drive mode, a limp mode is entered. During the limp mode, the first contactor is closed to provide a limp mode current path from the high voltage battery supply node through the first contactor to the inverter to power the electric motor.

20 Claims, 3 Drawing Sheets

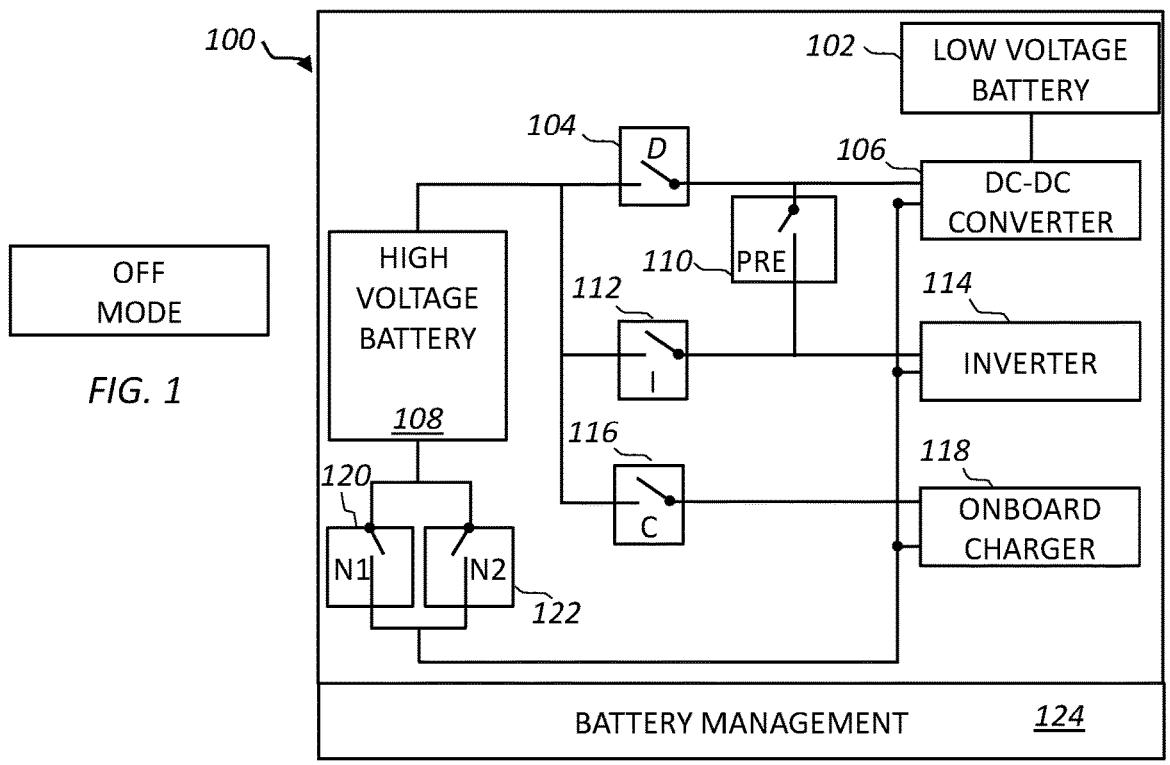
FIG. 1 OFF MODE
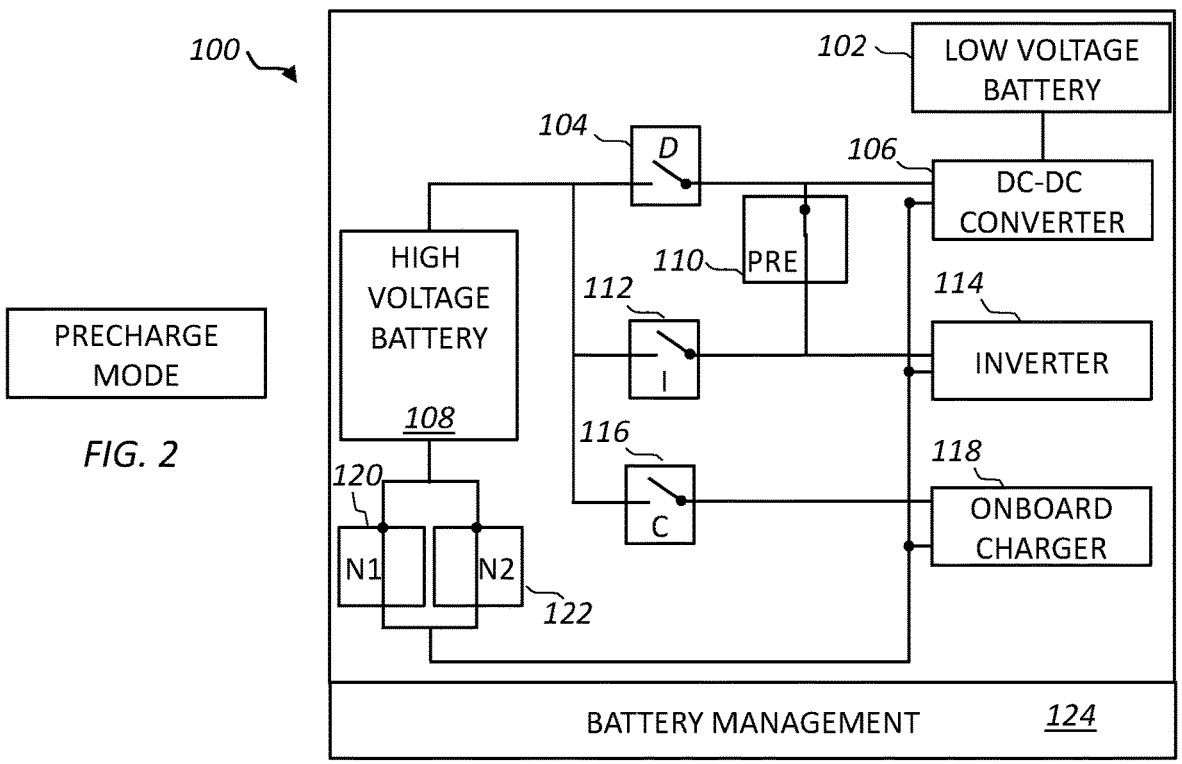
FIG. 2 PRECHARGE MODE ically rechargeable using an external source of electric power, as well by the vehicle's onboard engine, and designed to provide power over sustained periods of time. High-voltage battery 108 can provide a suitable level of voltage, for example 48 Volts. Low-voltage battery 102 can be a lead acid, lithium ion, or other suitable battery that provides a relatively low voltage for example 12 Volts.

SYSTEMS AND METHODS FOR INCREASING DEGRADED TORQUE AVAILABILITY

CROSS-REFERENCE TO RELATED APPLICATIONS

This application claims the priority under 35 U.S.C. § 119 of European Patent application no. 21305449.7, filed on 8 Apr. 2021, the contents of which are incorporated by reference herein.

BACKGROUND

Field

This disclosure relates generally to electrification systems, and more specifically, to systems and methods for increasing availability of torque in a device or vehicle propelled by an electric motor.

Related Art

A vehicle or device driven by an electric motor can be a combination of many complex systems. One of those systems is an inverter system that converts DC battery voltage to AC voltage with high current to drive the electric motor during operation. If the current to drive the motor is suddenly not available while the vehicle or device is in full operation, the situation may result in a vehicle or device slowing or stopping without advance warning.

Accordingly, it is desirable to provide an inverter system capable of mitigating a sudden loss of current during operation.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 1 illustrates a block diagram of components of an electrification system during off mode in accordance with selected embodiments of the present disclosure.

FIG. 2 illustrates a block diagram of components of an electrification system during pre-charge mode in accordance with selected embodiments of the present disclosure.

DETAILED DESCRIPTION

Figure 3:
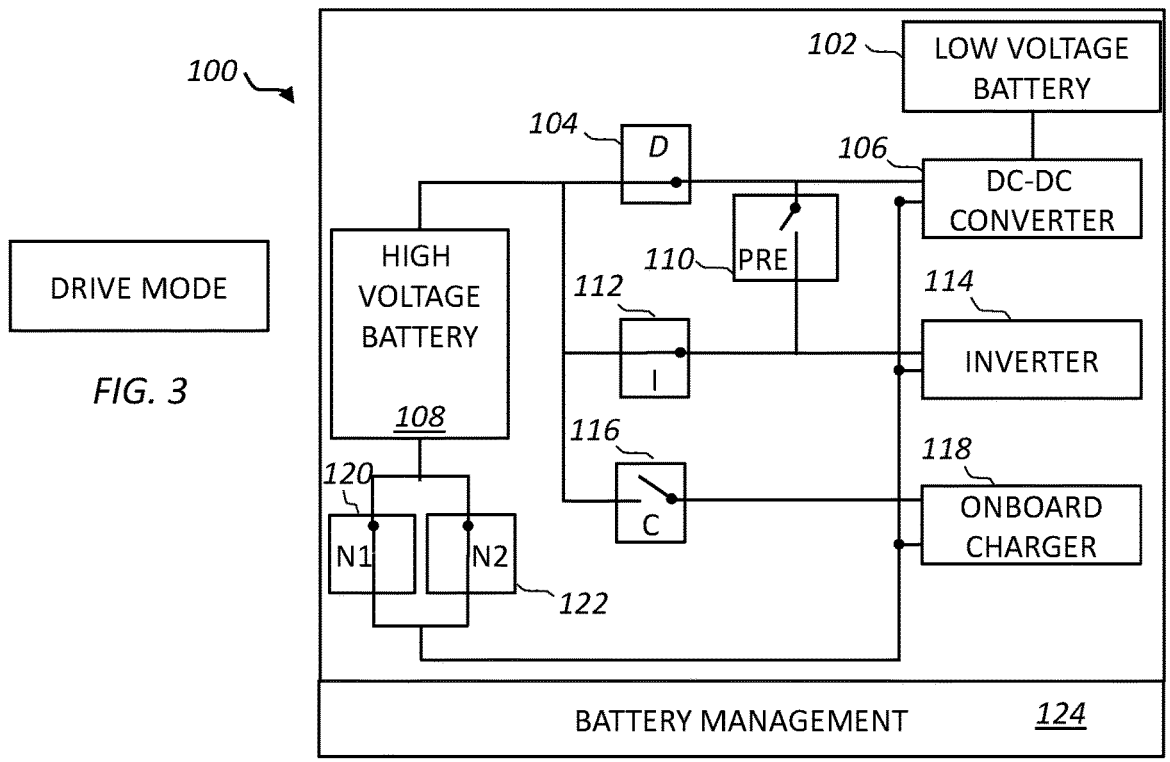
FIG. 3 illustrates a block diagram of components of an electrification system during drive mode in accordance with selected embodiments of the present disclosure.

Embodiments of devices and methods disclosed herein provide an electrification system that is capable of continuing to run even when a failure in occurs in a device that provides DC voltage to a traction inverter in the electrification system. The electrification system includes a high-voltage battery and a low voltage battery. When contact to the high-voltage battery is lost while the vehicle is operating, a pre-charge contact can be used to continue to provide voltage from the high voltage battery to the inverter, thereby allowing the inverter to continue operating at reduced power and torque. This capability prevents the vehicle from suddenly stopping without warning, which could present hazards for the user. By continuing to drive the electric motor, the vehicle may be operated until it reaches a safe place to come to a stop.

FIG. 1 illustrates a block diagram of components of electrification system 100 during an off mode of operation in accordance with selected embodiments of the present disclosure. Electrification system 100 can include low voltage battery 102, drive contactor 104, DC-DC converter 106, high-voltage battery 108, pre-charge contactor 110, inverter contactor 112, inverter circuitry 114, charge contactor 116, on-board charger circuit 118, and negative contactors 120, 122.

Drive contactor 104 is coupled between a positive terminal of high-voltage battery 108 and DC-DC converter 106. Pre-charge contactor 110 has a first terminal coupled between the output of drive contactor 104 and DC-DC converter 106, and a second terminal coupled between the output of inverter contactor 112 and an input to inverter circuitry 114. Inverter contactor 112 is coupled between the positive terminal of high-voltage battery 108 and inverter circuitry 114. Charger contactor 116 is coupled between the positive terminal of high-voltage battery 108 and an input to on-board charger 118. First negative contactor 120 has a first terminal coupled to DC-DC converter 106, inverter circuitry 114, and on-board charger 118 and a second terminal coupled to the negative terminal of high-voltage battery 108. Second negative contactor 122 is coupled in parallel with negative contactor 120 and has a first terminal coupled to DC-DC converter 106, inverter circuitry 114, and on-board charger 118 and a second terminal coupled to the negative terminal of high-voltage battery 108. Battery management circuitry 124 is also included in electrification system 100.

Drive contactor 104, inverter contactor 112, and charge contactor 116 are configured to receive high-voltage input from high-voltage battery 108. DC-DC converter 106 receives input from low voltage battery 102 and high-voltage from high-voltage battery 108 when drive contactor 104 is closed. DC-DC converter 106 is coupled to the negative terminal of high-voltage battery 108 when either or both negative contactors 120, 122 are closed. High voltage from DC-DC converter 106 is provided to inverter circuitry 114 when pre-charge contactor 110 is closed. High-voltage battery 108 provides voltage to inverter circuitry 114 when inverter contactor 112 is closed. High-voltage from high-voltage battery 108 is provided to on-board charger 118 when charging contactor 116 is closed.

High-voltage battery 108 may be one or more of any suitable type of battery for electrical vehicles or industrial applications, such as lithium-ion, lithium polymer lead acid, nickel cadmium, nickel metal hydride, zinc air, and sodium nickel chloride batteries. High-voltage battery 108 is typically rechargeable using an external source of electric power, as well by the vehicle's onboard engine, and designed to provide power over sustained periods of time. High-voltage battery 108 can provide a suitable level of voltage, for example 48 Volts. Low-voltage battery 102 can be a lead acid, lithium ion, or other suitable battery that provides a relatively low voltage for example 12 Volts.

DC-DC converter 106 includes electric circuitry that converts direct current from low-voltage battery 102 from one voltage level to another by storing the input energy temporarily and then releasing that energy to the output at a different voltage. The storage may be in either magnetic field storage components such as inductors or transformers, or electric field storage components such as capacitors. Low voltage battery 102 can be used to pre-charge inverter circuitry 114 during a pre-charge mode, and to keep inverter circuitry 114 running during a limp mode, as further described herein.

Battery management circuitry 124 can include a battery management system controller that is configured to control and monitor operation of high-voltage battery 108, DC-DC converter 106, on-board charger 118, and inverter circuitry 114, and to provide information to in-vehicle networks for diagnostic and safety purposes. In addition, battery management circuitry 124 can also control operation of contactors 104, 110, 112, 116, 120, 122 to configure electrification system 100 for various operating modes including off, pre-charge, drive, and limp modes. Battery management circuitry 124 can include a processor, a power management integrated circuit, networking circuitry, and analog front end circuitry such as analog-to-digital converters and temperature and pressure sensors.

Inverter circuitry 114 can include a motor controller and a power module that includes a high-voltage power device, such as insulated gate bipolar transistor, to drive three or six phase motors at the desired power level. Current from the power devices can be provided to the controller to adjust the level of current that is provided to the motor based on the power requirements. Inverter circuitry 114 can further include networking components to share information with other components of electrification system 100.

Negative contactors 120, 122 are coupled in parallel to one another and provide contact to a negative terminal of high-voltage battery 108. Negative contactors 120, 122 provide redundancy for one another by each having one terminal coupled to each other and to DC-DC converter 106, inverter circuitry 114 and on-board charger 118. A second terminal of each of negative contactors 120, 122 is coupled to a negative terminal of high-voltage battery 108.

In the off mode of operation as shown and in FIG. 1, contactors 104, 110, 112, 116, 120, 122 are open so that DC-DC converter 106, inverter circuitry 114, and on-board charger 118 are not receiving voltage from high-voltage battery 108 from respective drive contactor 104, inverter contactor 112 or charging contactor 116. The negative contactors 120, 122 are also disconnected from DC-DC converter 106, inverter circuitry 114, and on-board charger 118.

Before going into a full operational mode, when a start button or other control to start a vehicle or other device that includes electrification system 100 is activated, electrification system 100 can enter a pre-charge mode to avoid inrush current that can cause arcing between inverter contactor 112 and inverter circuitry 114. FIG. 2 illustrates a block diagram of a configuration of components of electrification system 100 during pre-charge mode in accordance with selected embodiments of the present disclosure. In pre-charge mode, drive contactor 104, inverter contactor 112, charger contactor 116, and negative contactors 120, 122 are closed. DC-DC converter 106, inverter circuitry 114, and on-board charger 118 do not receive voltage from high-voltage battery 108 from respective drive contactor 104, inverter contactor 112 or charging contactor 116. The negative contactors 120, 122 are connected to DC-DC converter 106, inverter circuitry 114, and on-board charger 118. Pre-charge contactor 110 is closed to allow current from low-voltage battery 102 to charge inverter circuitry 114 through DCDC converter 106.

FIG. 3 illustrates a block diagram of components of electrification system 100 during a drive mode of operation in accordance with selected embodiments of the present disclosure. In the drive mode of operation, drive contactor 104, inverter contactor 112, and negative contactors 120, 122 are closed so that DC-DC converter 106, inverter circuitry 114 receive voltage from high-voltage battery 108 through respective drive contactor 104 and inverter contactor 112. The negative contactors 120, 122 are also connected to DC-DC converter 106, inverter circuitry 114, and on-board charger 118 to close the circuit between positive and negative terminals of high-voltage battery 108. Pre-charge contactor 110 is open to prevent current from low-voltage battery 102 from charging inverter circuitry 114 through DCDC converter 106. Charger contactor 116 is also open.

While electrification system 100 is in the drive mode of operation, battery management circuitry 124 monitors and controls current being drawn from high-voltage battery 108 as well as current being supplied to DCDC converter 106 and inverter circuitry 114. A battery cell controller (not shown) in battery management circuitry 124 can perform analog-to-digital conversions of the differential cell voltages and current, as well as battery coulomb counting and battery temperature measurements. The information can be transmitted to a microcontroller processor using an interface such as Serial Peripheral Interface (SPI) or Transformer physical layer (TPL)) of the battery cell controller.

DCDC converter 106 can thus be a two-way converter. During the drive mode of operation, DCDC converter 106 can operate in a first direction to power components such as displays and steering from high voltage battery 108. During the pre-charge mode of operation, DCDC converter 106 can operate in a second direction, opposite the first direction, to provide voltage from low voltage battery 102 to inverter 114.

Battery management circuitry 124 can also detect faults in electrification system 100. One fault that can occur during the drive mode of operation is a short circuit to ground of DCDC converter 106. In this case, inverter circuitry 114 stays powered through the connection to high-voltage battery 108 through inverter contactor 112.

Figure 4:
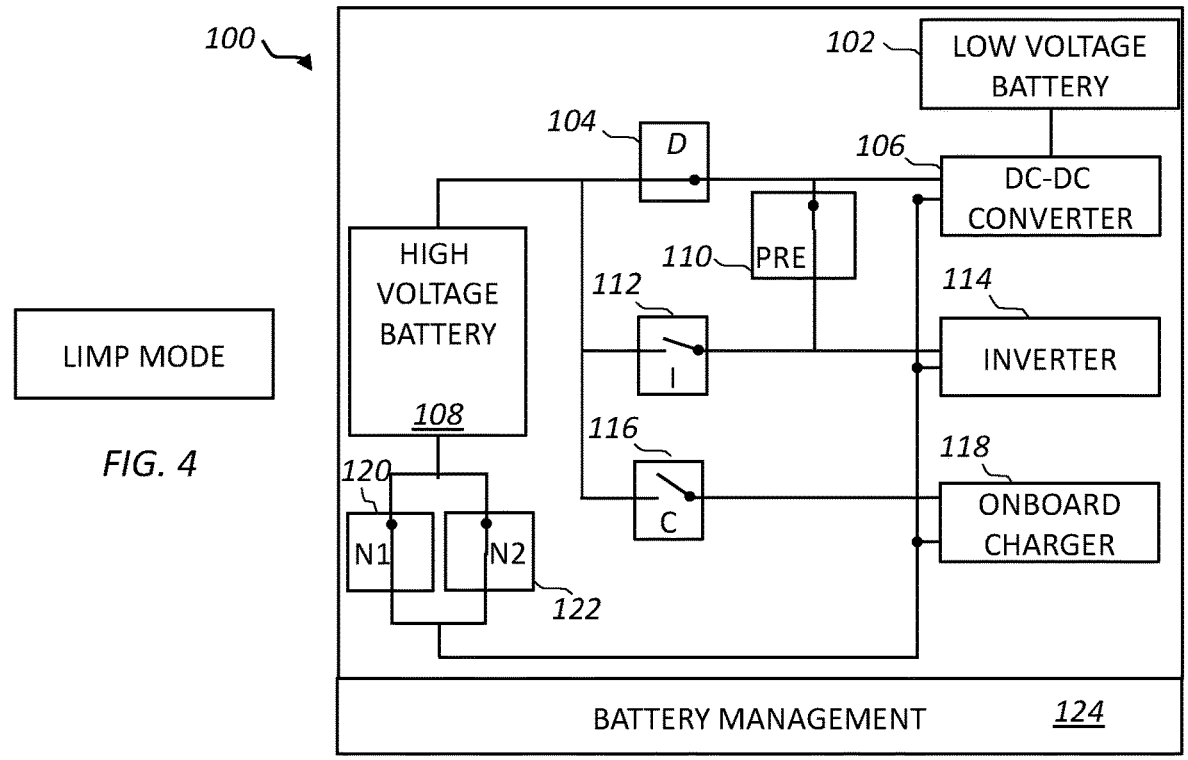
FIG. 4 illustrates a block diagram of components of an electrification system during limp mode in accordance with selected embodiments of the present disclosure.

Another fault that can occur during the drive mode of operation is short circuit to ground failure of inverter circuitry 114. This fault can occur when inverter contactor 112 is open. In this case, battery management circuitry 124 can enter a limp mode of operation in which the DCDC converter 106 remains powered and voltage is supplied from low-voltage battery 102 to inverter circuitry 114 through DCDC converter 106 and pre-charge contactor 110. FIG. 4 illustrates a block diagram of components of electrification system 100 during a limp mode of operation in accordance with selected embodiments of the present disclosure. During the limp mode of operation, inverter contactor 112 and charge contactor 116 are open so high-voltage battery 108 is disconnected from inverter circuitry 114 and onboard charger 118. Drive contactor 104 is closed so high-voltage battery 108 is connected to DCDC converter 106 through drive contactor 104. Negative contactors 120, 122 are closed, connecting DCDC converter 106, inverter circuitry 114 and onboard charger 118 to negative terminals of high-voltage battery 108.

Pre-charge contactor 110 is closed during the limp mode of operation to allow inverter circuitry 114 to be powered by high battery 108 through drive contactor 104 and pre-charge contactor 110. Although the amount of voltage through pre-charge contactor 110 may be lower than the voltage inverter contactor 112, entering the limp mode of operation allows inverter circuitry 114 to continue operating and generating torque instead of stopping suddenly after complete loss of power from high-voltage battery 108 through inverter contactor 112. Battery management circuitry 124 can detect when there is a short circuit to ground failure of inverter circuitry 114 as there will be no current drawn by inverter circuitry 114 from high-voltage battery 108. When the short circuit to ground failure of inverter circuitry 114 is detected, battery management circuitry can close pre-charge contactor 110 to connect high voltage battery 102 to inverter circuitry 114.

Figure 5:
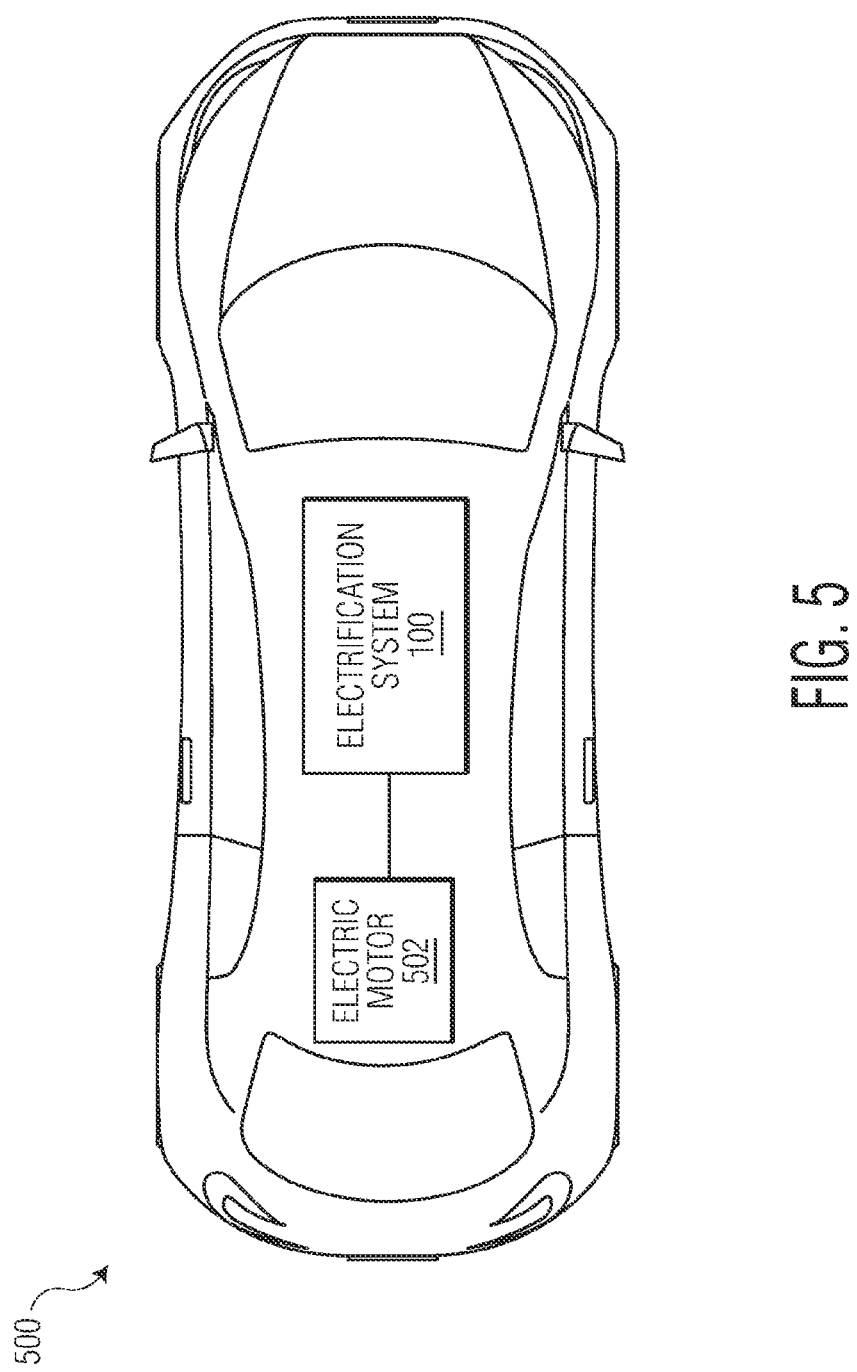
FIG. 5 illustrates a block diagram of components in an electric vehicle including the electrification system of FIGS. 1 through 4 in accordance with selected embodiments of the present disclosure.

Referring to FIGS. 3-5, FIG. 5 illustrates a block diagram of components in electric vehicle 500 including electrification system 100 of FIGS. 1 through 4 in accordance with selected embodiments of the present disclosure. Electric vehicle 500 includes electric motor 502 connected to electrification system 100. Electric motor 502 can be any suitable type of electric motor such as a brushless DC motor, a brushed DC motor, or an AC induction motor, among others. Electrification system 100 can also be used in hybrid vehicles that include both an internal combustion engine and electric motor 502. In a hybrid vehicle, high-voltage battery 108 and suitable types of low-voltage battery 102 can be recharged through regenerative braking and the internal combustion engine, while inverter circuitry 114 is used to drive electric motor 502. Some hybrid vehicles can also be recharged by plugging them into an electrical outlet.

Whether electric vehicle 500 is a hybrid or a peer electrical vehicle, electrification system 100 can be used to enable voltage to be supplied to inverter circuitry 114 through pre-charge contactor 110 even when the connection between high-voltage battery 108 and inverter circuitry 114 is lost. The power supplied by high battery 108 during the limp mode of operation may not be as high as that provided by high-voltage battery 108 during the drive mode of operation, depending on the current capacity of pre-charge contactor 110, however there are advantages to enabling electric vehicle 500 to continue moving to a safe location as opposed to stopping in the middle of traffic or other potentially hazardous situation.

Note that aside from automobiles, electrification system 100 can be used in other types of devices where it is desirable for electric motor 502 to continue operating, even if at reduced power, if a connection to a voltage source to drive electric motor 502 suddenly becomes unavailable. Battery management circuitry 124 can also provide an indication of the range available to operate the vehicle or device in limp mode. The indication can be provided on a dashboard or other suitable device.

In addition, the configuration of electrification system 100 can place negative contactors 120, 122 in parallel to provide backup for one another in case a connection to one of negative contactor 120, 122 fails. Thus, electrification system 100 provides backup capability in the event of failure of inverter contactor 112 or either of negative contactors 120, 122 without adding any additional contactors to the overall architecture.

By now it should be appreciated that in some embodiments, there has been provided a battery management circuit for use in an electric vehicle that can comprise a first output configured to provide a first control signal to a control input of a first contactor (D1) having a first terminal coupled to a high voltage battery supply node ((+) node of 108) and a second terminal coupled to a first terminal of a direct current to direct current (DCDC) converter (106). A second terminal of the DCDC converter can be coupled to a low voltage battery supply node (102). A second output can be configured to provide a second control signal to a control input of a second contactor (I) having a first terminal coupled to the high voltage battery supply node and a second terminal coupled to a first terminal of an inverter for an electric motor, wherein the inverter can include a capacitor. A third output can be configured to provide a third control signal to a control input of a third contactor (IPRE), wherein the third contactor can have a first terminal coupled to the second terminal of the first contactor and the first terminal of the DCDC converter, and a second terminal coupled to the second terminal of the second contactor and the first terminal of the inverter. The battery management circuit can be configured to: during a pre-charge mode of operation, provide a pre-charge current path from the low voltage battery supply node, through the DCDC converter and the third contactor, to the inverter to pre-charge the capacitor in the inverter. During a drive mode of operation, a primary current path can be provided from the high voltage supply node, through the second contactor, to the inverter to power the electric motor. During the drive mode of operation, in response to detecting a fault corresponding to the second contactor in which the primary current path becomes unavailable, a limp mode of operation can be entered to provide a secondary current path from the high voltage battery supply node, through the third contactor, to the inverter to power the electric motor.

In another aspect, the battery management circuit can be configured to, during the drive mode of operation, provide a second primary current path from the high voltage battery node through the first contactor to the DCDC converter.

In another aspect, the battery management circuit can be configured to, during the drive mode of operation, prior to entering the limp mode of operation, negate the third control signal to open the third contactor.

In another aspect, the DCDC converter can be characterized as a two-way converter, wherein during the drive mode of operation, the DCDC converter operates in a first direction, and, during the pre-charge mode of operation, the DCDC converter operates in a second direction, opposite the first direction.

In another aspect, the battery management circuit can be configured to, during the pre-charge mode of operation, assert the third control signal to close the third contactor and negate the first and second control signals to open the first and second contactors.

In another aspect, the battery management circuit can be configured to, during the drive mode of operation to provide the primary current path, assert the first and second control signals to close the first and second contactors and negate the third control signal to open the third contactor.

In another aspect, the battery management circuit can be configured to, upon entering the limp mode of operation to provide the secondary current path, assert the third control signal to close the third contactor.

In another aspect, the battery management circuit can further comprise a fourth output configured to provide a fourth control signal to control inputs of a fourth and fifth contactor, coupled in parallel to each other, between a second high voltage battery supply node ((−) node of 108) and each of the first terminals of the DCDC converter and the inverter.

In another aspect, the battery management circuit can be configured to assert the fourth control signal to close each of the fourth and fifth contactors during the pre-charge mode, the drive mode, and the limp mode of operation.

In other embodiments, a method can comprise: during a pre-charge mode of operation, closing a first contactor (IPRE) to provide a pre-charge current path from a low voltage battery supply node through a DCDC converter and through the first contactor to pre-charge a capacitor of an inverter for an electric motor. During a drive mode of operation following the pre-charge mode, the first contactor can be opened and a second contactor (I) can be closed to provide a drive mode current path from a high voltage battery supply node through the second contactor to the inverter to power the electric motor. In response to detecting an open fault in the second contactor during the drive mode of operation, a limp mode of operation can be entered; and during the limp mode of operation, the first contactor can be closed to provide a limp mode current path from the high voltage battery supply node through the first contactor to the inverter to power the electric motor.

In another aspect, during the drive mode of operation, the method can further comprise closing a third contactor (D1) to provide a second drive mode current path from the high voltage battery node through the third contactor to the DCDC converter.

In further embodiments an electric vehicle can comprise: a high voltage battery supply node; a low voltage battery supply node, wherein the high voltage battery supply node supplies a positive voltage that can be greater than a positive voltage supplied by the low voltage battery supply node; a direct current to direct current (DCDC) converter; an inverter for an electric motor, the inverter having a capacitor; a first contactor (D1) having a first terminal coupled to the high voltage battery supply node and a second terminal coupled to a first terminal of the DCDC converter, wherein a second terminal of the DCDC converter can be coupled to the low voltage battery supply node; a second contactor (I) having a first terminal coupled to the high voltage battery supply node and a second terminal coupled to a first terminal of the inverter; a third contactor (IPRE) having a first terminal coupled to the second terminal of the first contactor and the first terminal of the DCDC converter, and having a second terminal coupled to the second terminal of the second contactor and the first terminal of the inverter; and a battery management circuit that can be configured to: during a pre-charge mode of operation, provide a pre-charge current path from the low voltage battery supply node, through the DCDC converter and the third contactor, to the inverter to pre-charge the capacitor in the inverter; during a drive mode of operation, provide a drive mode current path from the high voltage supply node, through the second contactor, to the inverter to power the electric motor; and during the drive mode of operation, in response to detecting a fault corresponding to the second contactor in which the drive mode current path becomes unavailable, enter a limp mode to provide a limp mode current path from the high voltage battery supply node, through the third contactor, to the inverter to power the electric motor.

In another aspect, the electric vehicle can be configured to, during the drive mode of operation, provide a second drive mode current path from the high voltage battery node through the first contactor to the DCDC converter.

In another aspect, the DCDC converter can be a two-way converter, during the drive mode, the DCDC converter can operate in a first direction, and during the pre-charge mode, the DCDC converter can operate in a second direction, opposite the first direction.

In another aspect, the battery management circuit can be configured to, during the pre-charge mode of operation, close the third contactor and open the first and second contactors.

In another aspect, the battery management circuit can be configured to, during the drive mode of operation, to provide the drive mode current path, close the first and second contactors and open the third contactor.

In another aspect, the battery management circuit can be configured to: upon entering the limp mode of operation to provide the limp mode current path, close the third contactor.

In another aspect, the electric vehicle further can comprise a fourth contactor and a fifth contactor, coupled in parallel to each other, between a second high voltage battery supply node and each of the first terminals of the DCDC converter and the inverter.

In another aspect, the battery management circuit can be configured to close each of the fourth and fifth contactors during the pre-charge mode, the drive mode, and the limp mode of operation.

In another aspect, the electric vehicle can be characterized as one of a full electric vehicle or a hybrid electric vehicle.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name, a lower case "b" following the signal name, or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals. As used herein, the phrase "during a mode" may be equivalent with the phrase "whilst operating in that mode".

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed. Also, in embodiment, the illustrated elements of each of FIGS. 1-4 can be circuitry located on a single integrated circuit or within a same device.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

The invention claimed is:

1. A battery management circuit for use in an electric vehicle and comprising:
    a first output configured to provide a first control signal to a control input of a first contactor having a first terminal coupled to a high voltage battery supply node and a second terminal coupled to a first terminal of a direct current to direct current, DCDC, converter, wherein a second terminal of the DCDC converter is coupled to a low voltage battery supply node;
    a second output configured to provide a second control signal to a control input of a second contactor having a first terminal coupled to the high voltage battery supply node and a second terminal coupled to a first terminal of an inverter for an electric motor, wherein the inverter includes a capacitor; and
    a third output configured to provide a third control signal to a control input of a third contactor, wherein the third contactor has a first terminal coupled to the second terminal of the first contactor and to the first terminal of the DCDC converter, and has a second terminal coupled to the second terminal of the second contactor and to the first terminal of the inverter;
    wherein the battery management circuit is configured to:
        during a pre-charge mode, provide a pre-charge current path from the low voltage battery supply node, through the DCDC converter and the third contactor, to the inverter to pre-charge the capacitor in the inverter;
        during a drive mode, provide a primary current path from the high voltage battery supply node, through the second contactor, to the inverter to power the electric motor; and
        during the drive mode, in response to detecting a fault associated with the second contactor in which the primary current path becomes unavailable, enter a limp mode to provide a secondary current path from the high voltage battery supply node, through the third contactor, to the inverter to power the electric motor.

2. The battery management circuit of claim 1, configured to, during the drive mode, provide a second primary current path from the high voltage battery node through the first contactor to the DCDC converter.

3. The battery management circuit of claim 2, configured to, during the drive mode, prior to entering the limp mode, negate the third control signal to open the third contactor.

4. The battery management circuit of claim 2, wherein the DCDC converter is characterized as a two-way converter, wherein during the drive mode, the DCDC converter operates in a first direction, and, during the pre-charge mode, the DCDC converter operates in a second direction, opposite the first direction.

5. The battery management circuit of claim 1, configured to:
    during the pre-charge mode, assert the third control signal to close the third contactor and negate the first and second control signals to open the first and second contactors.

6. The battery management circuit of claim 5, configured to:
    during the drive mode to provide the primary current path, assert the first and second control signals to close the first and second contactors respectively and negate the third control signal to open the third contactor.

7. The battery management circuit of claim 6, configured to:
    upon entering the limp mode to provide the secondary current path, assert the third control signal to close the third contactor.

8. The battery management circuit of claim 1, further comprising:
    a fourth output configured to provide a fourth control signal to control inputs of a fourth and fifth contactor, coupled in parallel to each other, between a second high voltage battery supply node and each of the first terminals of the DCDC converter and the inverter.

9. The battery management circuit of claim 8, configured to assert the fourth control signal to close each of the fourth and fifth contactors during the pre-charge mode, the drive mode, and the limp mode.

10. A method comprising:
    during a pre-charge mode, closing a first contactor to provide a pre-charge current path from a low voltage battery supply node through a DCDC converter and through the first contactor to pre-charge a capacitor of an inverter for an electric motor;
    during a drive mode following the pre-charge mode, opening the first contactor and closing a second contactor to provide a drive mode current path from a high voltage battery supply node through the second contactor to the inverter to power the electric motor;
    in response to detecting an open fault in the second contactor during the drive mode, entering a limp mode; and
    during the limp mode, closing the first contactor to provide a limp mode current path from the high voltage battery supply node through the first contactor to the inverter to power the electric motor.

11. The method of claim 10, wherein during the drive mode, the method further comprises closing a third contactor to provide a second drive mode current path from the high voltage battery node through the third contactor to the DCDC converter.

12. An electric vehicle comprising:
a high voltage battery supply node;
a low voltage battery supply node, wherein the high voltage battery supply node supplies a positive voltage that is greater than a positive voltage supplied by the low voltage battery supply node;
a direct current to direct current (DCDC) converter;
an inverter for an electric motor, the inverter having a capacitor;
a first contactor having a first terminal coupled to the high voltage battery supply node and a second terminal coupled to a first terminal of the DCDC converter, wherein a second terminal of the DCDC converter is coupled to the low voltage battery supply node;
a second contactor having a first terminal coupled to the high voltage battery supply node and a second terminal coupled to a first terminal of the inverter;
a third contactor having a first terminal coupled to the second terminal of the first contactor and the first terminal of the DCDC converter, and having a second terminal coupled to the second terminal of the second contactor and the first terminal of the inverter; and
a battery management circuit configured to:
during a pre-charge mode, provide a pre-charge current path from the low voltage battery supply node, through the DCDC converter and the third contactor, to the inverter to pre-charge the capacitor in the inverter;
during a drive mode, provide a drive mode current path from the high voltage battery supply node, through the second contactor, to the inverter to power the electric motor; and
during the drive mode, in response to detecting a fault corresponding to the second contactor in which the drive mode current path becomes unavailable, enter a limp mode to provide a limp mode current path from the high voltage battery supply node, through the third contactor, to the inverter to power the electric motor.

13. The electric vehicle of claim 12, configured to, during the drive mode, provide a second drive mode current path from the high voltage battery node through the first contactor to the DCDC converter.

14. The electric vehicle of claim 13, wherein:
the DCDC converter is a two-way converter,
during the drive mode, the DCDC converter operates in a first direction, and
during the pre-charge mode, the DCDC converter operates in a second direction, opposite the first direction.

15. The electric vehicle of claim 12, wherein the battery management circuit is configured to:
during the pre-charge mode, close the third contactor and open the first and second contactors.

16. The electric vehicle of claim 15, wherein the battery management circuit is configured to:
during the drive mode to provide the drive mode current path, close the first and second contactors and open the third contactor.

17. The electric vehicle of claim 16, wherein the battery management circuit is configured to:
upon entering the limp mode to provide the limp mode current path, close the third contactor.

18. The electric vehicle of claim 12, further comprising:
a fourth contactor and a fifth contactor, coupled in parallel to each other, between a second high voltage battery supply node and each of the first terminals of the DCDC converter and the inverter.

19. The electric vehicle of claim 18, wherein the battery management circuit is configured to close each of the fourth and fifth contactors during the pre-charge mode, the drive mode, and the limp mode.

20. The electric vehicle of claim 12, wherein the electric vehicle is characterized as one of a full electric vehicle or a hybrid electric vehicle.

* * * * *